(12) United States Patent
Kolan et al.

(10) Patent No.: US 10,873,614 B2
(45) Date of Patent: Dec. 22, 2020

(54) METHOD AND APPARATUS FOR CONFIGURATION AND DEPLOYMENT OF MEDIA PROCESSING IN THE NETWORK

(71) Applicant: Samsung Electronics Co., Ltd., Suwon-si (KR)

(72) Inventors: Prakash Kolan, Plano, TX (US); Imed Bouazizi, Frisco, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/245,137

(22) Filed: Jan. 10, 2019

(65) Prior Publication Data

US 2019/0222621 A1    Jul. 18, 2019

Related U.S. Application Data

(60) Provisional application No. 62/618,417, filed on Jan. 17, 2018.

(51) Int. Cl.
*H04L 29/06* (2006.01)
*G06F 9/38* (2018.01)
(Continued)

(52) U.S. Cl.
CPC .......... *H04L 65/601* (2013.01); *G06F 9/3851* (2013.01); *G06F 9/5072* (2013.01); *G06F 16/483* (2019.01); *H04L 65/60* (2013.01)

(58) Field of Classification Search
CPC ... H04L 65/601; G06F 9/5072; G06F 16/483; G06F 9/3851
(Continued)

(56) References Cited

U.S. PATENT DOCUMENTS 10,200,428 B1 * 2/2019 Rosenzweig ....... H04L 41/0806
2012/0066285 A1   3/2012 McGowan et al.
(Continued)

OTHER PUBLICATIONS

"Resource Scheduling Approach for Multimedia Cloud Content Management"—Li et al, The Journal of Supercomputing 73, 5150-5172, May 18, 2017 https://link.springer.com/content/pdf/10.1007/s11227-017-2074-y.pdf (Year: 2017).*
(Continued)

*Primary Examiner* — Randy A Scott

(57) ABSTRACT

A method, an electronic device, and computer readable medium is provided. The method includes receiving, from a media source, a request for media processing, where the request includes a requested media output. The method also includes identifying one or more media processing functions to perform the request for media processing based on information associated with each of the one or more media processing functions. The method further includes configuring each of the one or more media processing functions by mapping the request for media processing to the one or more media processing functions based on the information associated with each of the one or more media processing functions. The method additionally includes monitoring the one or more media processing functions while the one or more media processing functions perform tasks to generate the requested media output.

20 Claims, 7 Drawing Sheets

(51) Int. Cl.
  *G06F 9/50*    (2006.01)
  *G06F 16/483*    (2019.01)
(58) Field of Classification Search
  USPC ................ 709/217, 219, 229, 230, 231, 238
  See application file for complete search history.

(56) References Cited

U.S. PATENT DOCUMENTS

| | | |
|---|---|---|
| 2012/0079600 A1 | 3/2012 | Kellerman et al. |
| 2013/0132581 A1 | 5/2013 | Shafiee |
| 2014/0188978 A1* | 7/2014 | Ng ........................... H04L 67/10 709/203 |
| 2015/0089035 A1* | 3/2015 | Yussouff ................. H04L 65/60 709/223 |
| 2016/0344803 A1* | 11/2016 | Batz ................... H04L 12/1407 |

OTHER PUBLICATIONS

ISA/KR, "International Search Report and Written Opinion of the International Searching Authority," Application No. PCT/KR2019/000666, dated May 1, 2019, 13 pages.

\* cited by examiner

US 10,873,614 B2

METHOD AND APPARATUS FOR CONFIGURATION AND DEPLOYMENT OF MEDIA PROCESSING IN THE NETWORK

CROSS-REFERENCE TO RELATED APPLICATION AND CLAIM OF PRIORITY

This application claims priority under 35 U.S.C. § 119(e) to U.S. Provisional Patent Application No. 62/618,417 filed on Jan. 17, 2018. The above-identified provisional patent application is hereby incorporated by reference in its entirety.

TECHNICAL FIELD

This disclosure relates generally to media processing. More specifically, this disclosure relates to network based media processing.

BACKGROUND

The use of computing technology for media processing is greatly expanding, largely due to the usability, convenience, computing power of computing devices, and the like. Portable electronic devices, such as laptops and mobile smart phones are becoming increasingly popular as a result of the devices becoming more compact, while the processing power and resources included a given device is increasing. Even with the increase of processing power portable electronic devices often struggle to provide the processing capabilities to handle new services and applications, as newer services and applications often require more resources that is included in a portable electronic device.

SUMMARY

This disclosure provides method and apparatus for configuration and deployment of media processing in the network.

In one embodiment, an electronic device is provided. The electronic device includes a communication interface and a processor. The communication interface is configured to receive, from a media source, a request for media processing where, the request includes a requested media output. The processor is configured to identify one or more media processing functions to perform the request for media processing based on information associated with each of the one or more media processing functions. The processor is also configured to configure each of the one or more media processing functions by mapping the request for media processing mapping the request for media processing to the one or more media processing functions based on the information associated with each of the one or more media processing functions. The processor is further configured to monitor the one or more media processing functions while the one or more media processing functions perform tasks to generate the requested media output.

In another embodiment, a method is provided. The method includes receiving, from a media source, a request for media processing, where the request includes a requested media output. The method also includes identifying one or more media processing functions to perform the request for media processing based on information associated with each of the one or more media processing functions. The method further includes configuring each of the one or more media processing functions by mapping the request for media processing to the one or more media processing functions based on the information associated with each of the one or more media processing functions. The method additionally includes monitoring the one or more media processing functions while the one or more media processing functions perform tasks to generate the requested media output.

In another embodiment, a non-transitory computer readable medium embodying a computer program is provided. The computer program includes computer readable program code that, when executed by a processor of an electronic device, causes the processor to: receive, from a media source, a request for media processing, the request including a requested media output; identify one or more media processing functions to perform the request for media processing based on the information associated with each of the one or more media processing functions; configure each of the one or more media processing functions by mapping the request for media processing mapping the request for media processing to the one or more media processing functions based on the information associated with each of the one or more media processing functions; and monitor the one or more media processing functions while the one or more media processing functions perform tasks to generate the requested media output.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
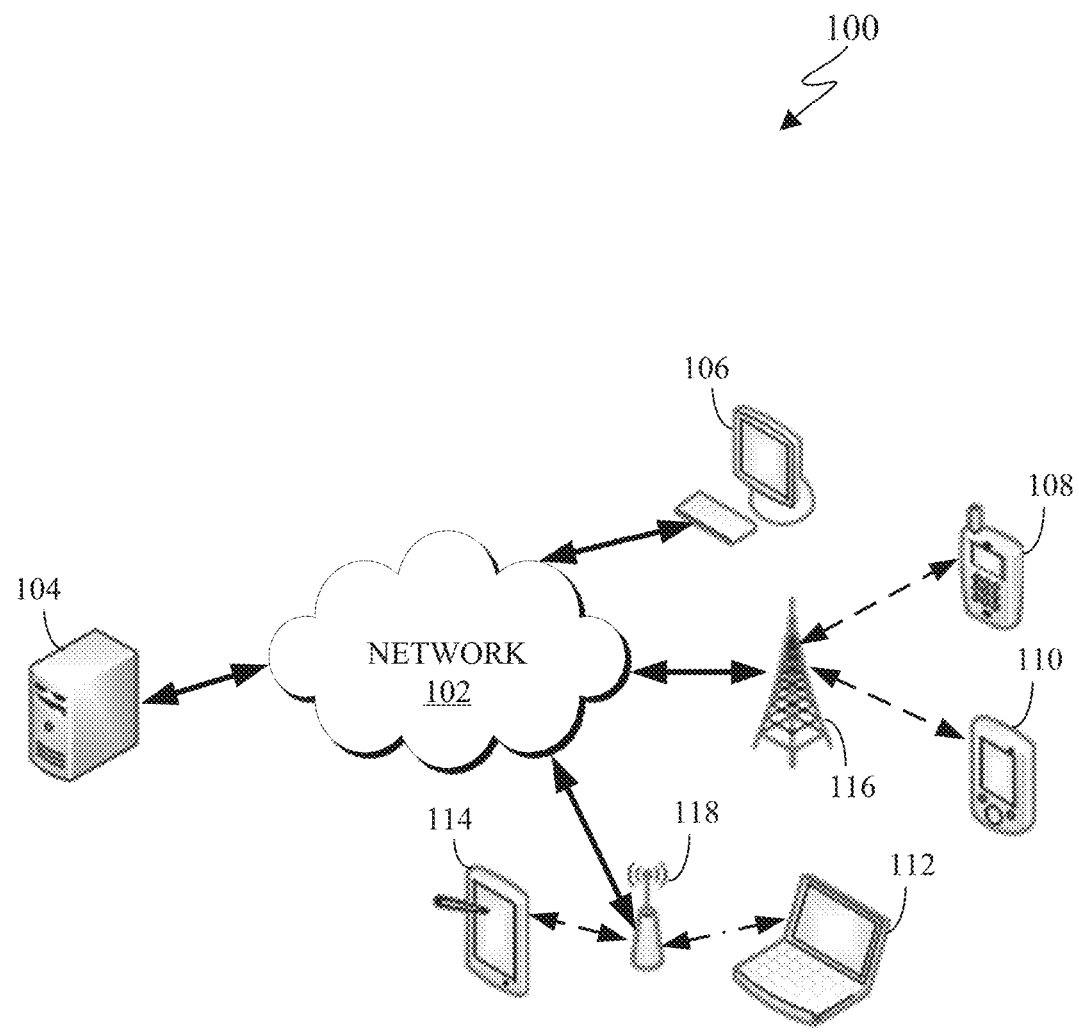
FIG. 1 illustrates an example communication system in accordance with an embodiment of this disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of this disclosure, can include a personal computer (such as a laptop or a desktop), a workstation, a server, a television, an appliance, a virtual assistant, and the like. Additionally, the electronic device can be at least one part of a piece of furniture or building/structure, an electronic board, an electronic signature receiving device, a projector, or a measurement device. In some embodiments, the electronic device can be a portable electronic device like a portable communication device (such as a smartphone or mobile phone), a laptop, a tablet, an electronic book reader (such as an e-reader), a personal digital assistant (PDA), a portable multimedia player (PMP), an MP3 player, a mobile medical device, a virtual reality headset, a portable game console, a camera, or a wearable device, among others. The electronic device can be one or a combination of the above-listed devices. Additionally, the electronic device as disclosed herein is not limited to the above-listed devices and can include new electronic devices depending on the development of technology. It should be noted that, as used here, the term "user" may denote a human or another device (such as an artificial intelligent electronic device) using the electronic device.

Embodiments of this disclosure recognize and take into consideration that, electronic devices often struggle to keep up with newer services and applications that are being developed. Even though the processing power of electronic devices continues to increase, newer applications and services are simultaneously developed that require additional resources, such as processing power, in order to accomplish each task. Additionally certain electronic devices are designed to be portable, such as a laptop and a smartphone, and due to their compact nature lack the processing capabilities of a workstation or a server. Embodiments of this disclosure also recognize and take into consideration that not all electronic devices include similar processing capabilities but the user of such a device could desire to perform a complex task that requires significant processing capabilities such as the processing requirements for media processing.

New services and application are able to perform complex tasks and provide a variety of services to end users, that some electronic devices struggle or are unable to perform due to the limited resources and capabilities of the device. For example, media processing services and applications require significant processing capabilities that are absent in some electronic devices. In another example, augmented reality (AR) often requires significant processing capabilities as well as bandwidth that are also not found in certain electronic devices. In yet another example, speech recognition processing, outlies significant processing capabilities that certain electronic devices lack.

Embodiments of this disclosure include systems and methods for offloading computations from an electronic device to a different processing entity. The latency and delay requirements of the respective application or service can be preserved when the computations are offloaded from the electronic device to a different processing entity. Additionally, embodiments of this disclosure include architecture for offloading media processing to a network via a Network Based Media Processing (NBMP) framework. The network can be a cloud service, provided by a third party service provider, or an operator of cloud entities.

Using a NBMP framework, a third party can define one or more network based media processing services out of a set of network based media processing functions that the end user can access through application programming interfaces (API). For example, the network enables the end user to build media processing workflows. A workflow manager is responsible for building the workflow and pipeline of media processing tasks based on the configuration of the end user. The workflow manager is associated with the network and is responsible for building the workflow and pipeline of media processing tasks as indicated by the end user. Virtual reality (VR) stitching is an example of a media processing workflow.

According to embodiments of this disclosure, the operator, such as a third party, provides a set of network based media processing functions or tasks that an end user can select in order to build a network based media processing workflow. For example, the NBMP framework can receive a workflow description to perform a particular media processing task. The NBMP can include a directory of all the functions that can be used in any media processing task. To perform the requested task, the NBMP framework identifies certain functions from the directory that can be used in the requested task. Thereafter all the necessary functions are compiled based on the configurations of each individual function that is selected to perform the requested task and the requested task. As a result, embodiments of this disclosure enable electronic devices to offload processing to a network instead of performing the processing locally on the electronic device itself.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102. In some embodiments, the server 104 includes a workflow manager that can select functions and build a workflow pipeline to perform a media processing task. The workflow manager is discussed in greater detail below with respect to FIGS. 4A, 4B, and 5.

Each client device 106-114 represents any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmits information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
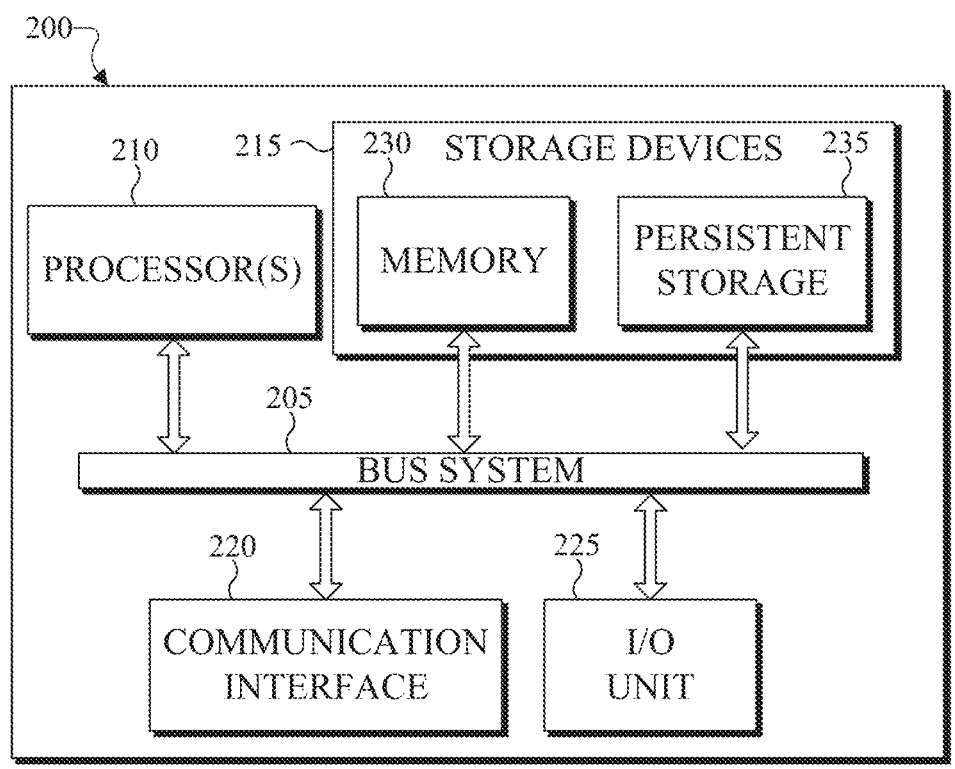
FIGS. 2 and 3 illustrate example electronic devices in accordance with an embodiment of this disclosure.
Figure 3:
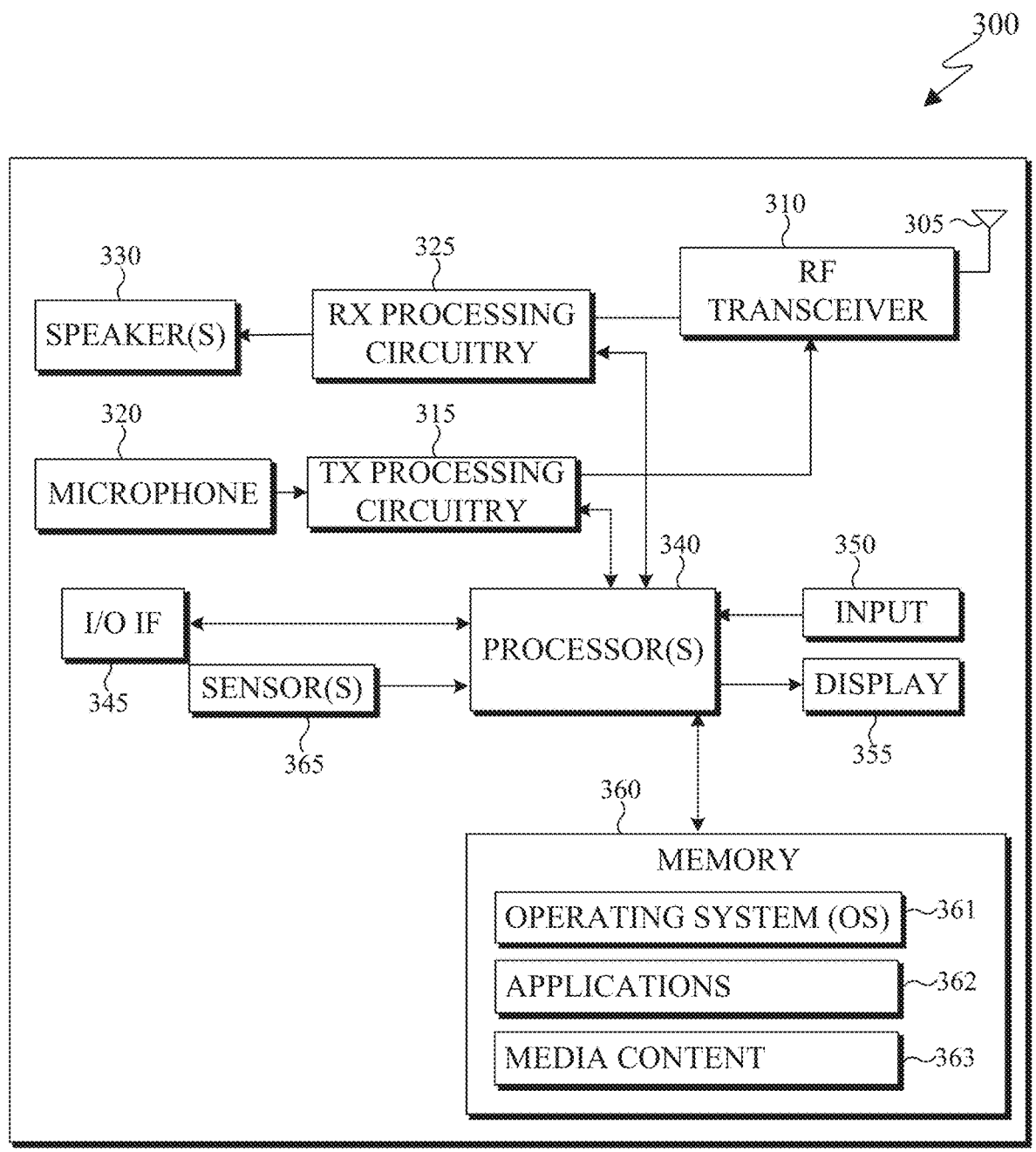

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, one or more remote servers, clustered computers, and components that act as a single pool of seamless resources, a cloud-based server, and the like. The server 200 can be accessed by one or more of the client devices 106-114 of FIG. 1.

As shown in FIG. 2, the server 200 includes a bus system 205 that supports communication between at least one processing device 210, at least one storage device 215, at least one communications interface 220, and at least one input/output (I/O) unit 225. The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-114.

For example, a desktop computer 106 or a laptop computer 112 could have the same or similar structure as that shown in FIG. 2.

FIG. 3 illustrates an example electronic device 300, and the electronic device 300 could represent one or more of the client devices 106-114 in FIG. 1. For example, in some embodiments, the electronic device 300 may implement or represent a virtual assistant device that can receive a natural language input, derive meaning from the input, and perform an action based on the derived meaning. The electronic device 300 can be a mobile communication device, such as, for example, a mobile station, a subscriber station, a wireless terminal, a desktop computer (similar to desktop computer 106 of FIG. 1), a portable electronic device (similar to the mobile device 108, PDA 110, laptop computer 112, or tablet computer 114 of FIG. 1), and the like.

As shown in FIG. 3, the electronic device 300 includes an antenna 305, a communication unit 310, transmit (TX) processing circuitry 315, a microphone 320, and receive (RX) processing circuitry 325. The communication unit 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361, one or more applications 362, and media content.

The communication unit 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in a memory 360, such as the OS 361 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing ASR processing and the like. The processor 340 can move data into or out of the memory 360 as required by an executing process. In some embodiments, the processor 340 is configured to execute a plurality of applications 362 based on the OS 361 or in response to signals received from external source(s) or an operator. Example, applications 362 can include a camera application (for still images and videos), a video phone call application, an email client, a social media client, an SMS messaging client, a virtual assistant, and the like. In some embodiments, the processor 340 is configured to receive and transmit the media content 363. The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with sensor(s) 365 and/or a camera by providing additional input to processor 340. In some embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content 363. The media content 363 can include various types of media such as images, videos, three-dimensional content, VR content, AR content, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor 365 can further include control circuits for controlling any of the sensors included therein. Any of these sensor(s) 365 can be located within the electronic device 300.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
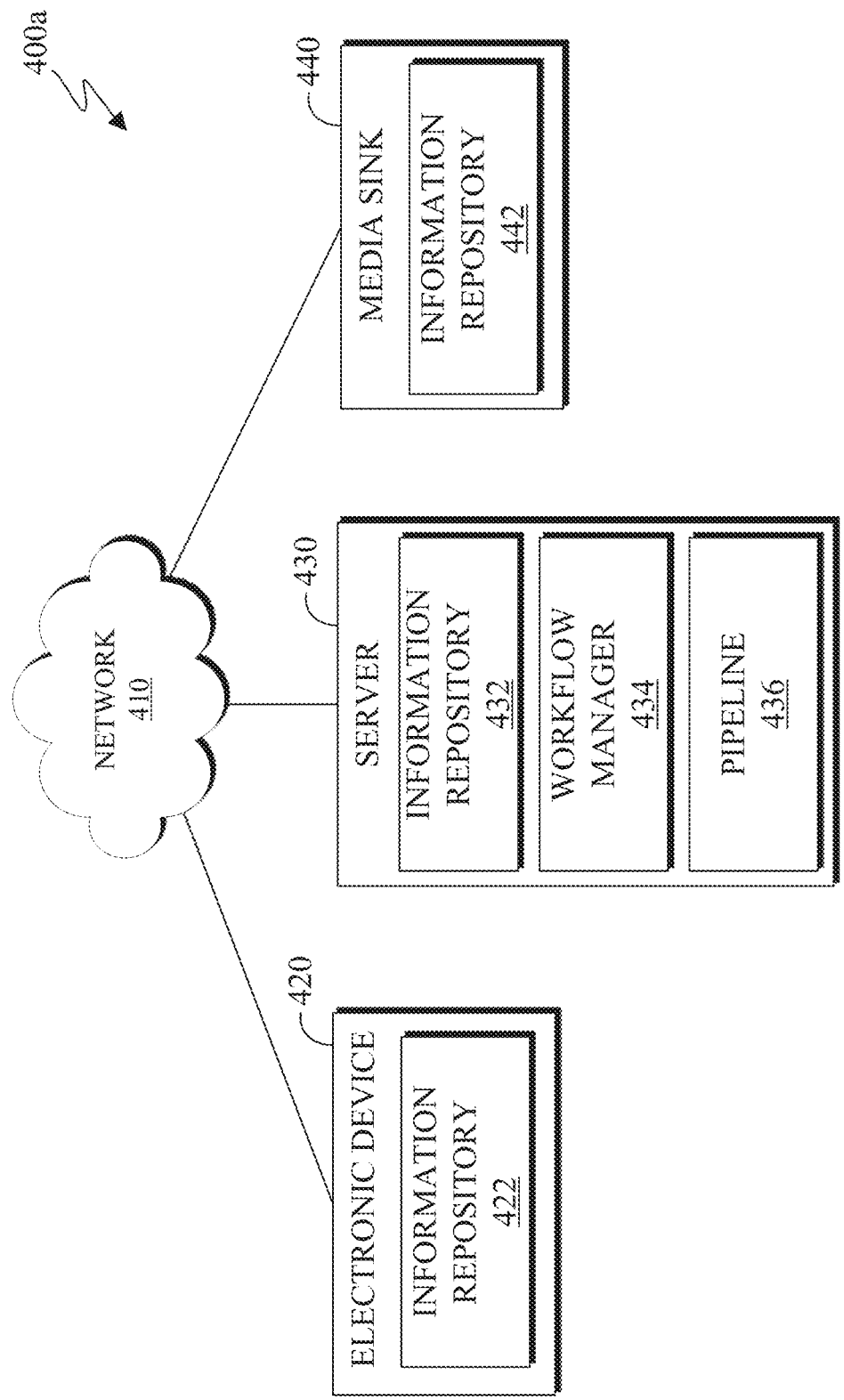
FIG. 4A illustrates a block diagram of an example environment-architecture in accordance with an embodiment of this disclosure.
Figure 4B:
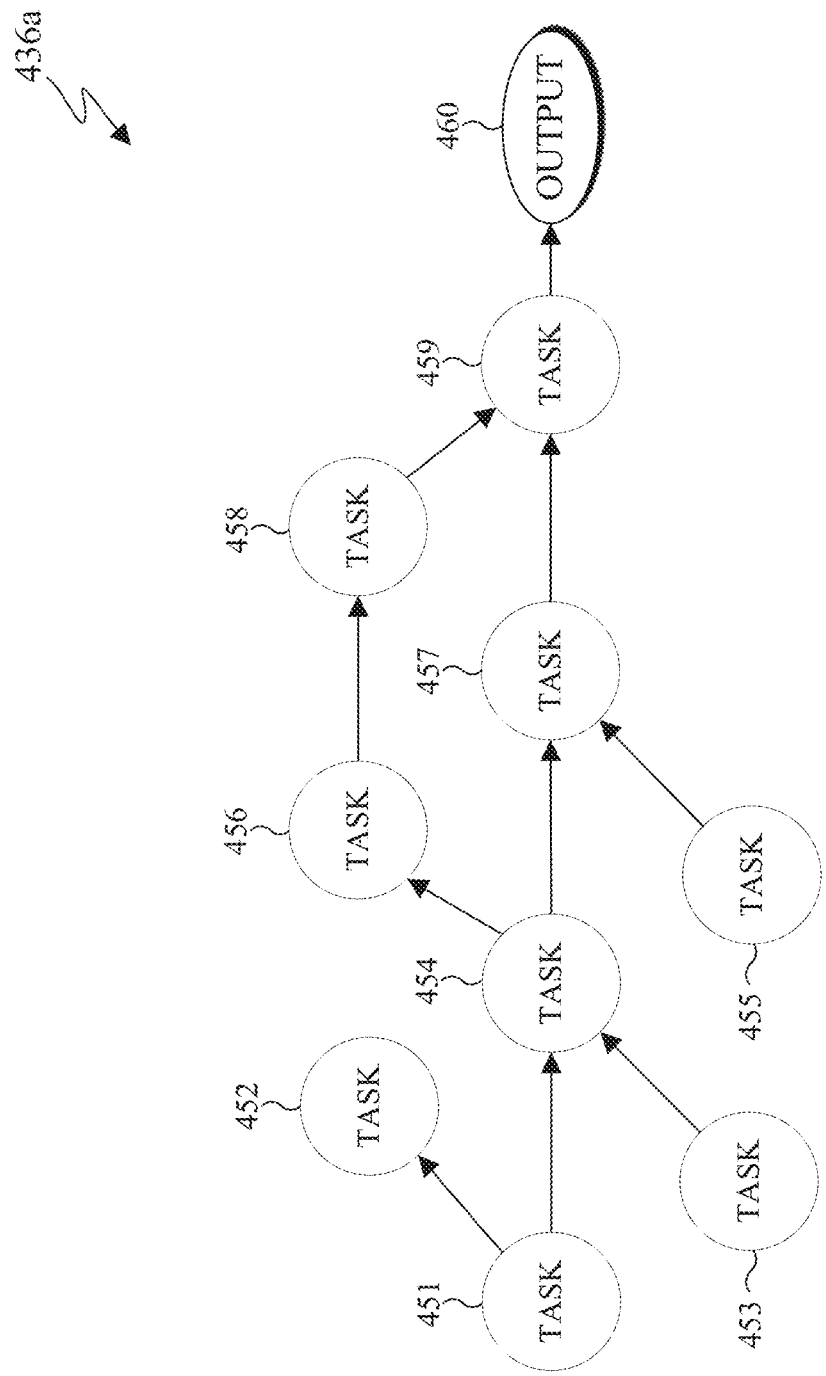
FIG. 4B illustrates and example pipeline in accordance with an embodiment of this disclosure.
Figure 4C:
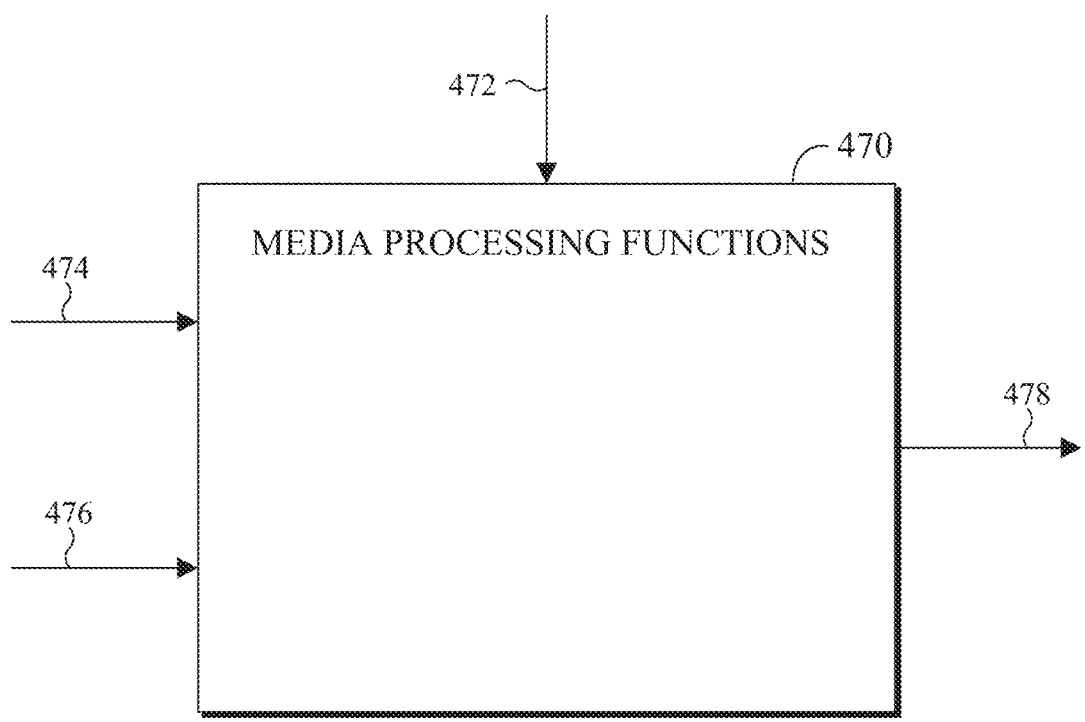
FIG. 4C illustrates an example media processing function in accordance with an embodiment of this disclosure.

FIG. 4A illustrates a block diagram 400 of an example environment-architecture in accordance with an embodiment of this disclosure. FIG. 4B illustrates and example pipeline 436a in accordance with an embodiment of this disclosure. FIG. 4C illustrates an example media processing function 470 in accordance with an embodiment of this disclosure. The embodiments of FIGS. 4A, 4B, and 4C are for illustration only. Other embodiments can be used without departing from the scope of this disclosure.

As shown in FIG. 4A, the block diagram 400 includes an electronic device 420, a server 430 and a media sink 440 in communication over a network 410. The network 410 can be the same as or similar to the network 102 of FIG. 1. In some embodiments, the network 410 represents a "cloud" of computers interconnected by one or more networks, where the network is a computing system utilizing clustered computers and components that act as a single pool of seamless resources when accessed. Also, in some embodiments, the network 410 is connected with one or more servers (such as the server 104 of FIG. 1, the server 200, and the server 430), one or more electronic devices (such as the client devices 106-114 of FIG. 1, the electronic device 300, and the electronic device 420). Further, in some embodiments, the network 410 can be connected to an information repository (such as the media sink 440, and database), that contains a look-up tables and information pertaining to various functions as well as a repository of published media.

In some embodiments, the electronic device 420 and the media sink 440 can represent one of the client devices 106-114 of FIG. 1, the electronic device 300 of FIG. 3, or other suitable device. In other embodiments, a portion of the components included in the electronic device 420 and the media sink 440 can be included in different devices, such as the server 430, multiple servers 104 or 200, multiple client devices 106-114, or other combination of different devices. In some embodiments, the electronic device 420 and the media sink 440 are the same device.

In this example, the electronic device 420 includes an information repository 422. Similarly the media sink 440 can includes an information repository 442. The electronic device 420 can include a camera or additional components that can capture or receive media. In some embodiments, the captured or recorded media requires a certain type of processing such as VR stitching, but lacks the processing capabilities to perform the necessary processing of the media content. The media sink 440 represents a storage device that the processed media can be delivered after processing by the server 430.

The information repository 422 and 442 represent any suitable structure(s) capable of storing and facilitating retrieval of information (such as data, program code, or other suitable information on a temporary or permanent basis). The information repository 422 and 442 can include a memory and a persistent storage. The memory can be RAM or any other suitable volatile or non-volatile storage device(s), while the persistent storage can contain one or more components or devices supporting longer-term storage of data, such as a ROM, hard drive, Flash memory, or optical disc. The information repositories 422 and 442 can include one or more media content such as the media content 363 of FIG. 3.

The electronic device 420 can include a user interface that enables a user to select media content to be offloaded from the information repository 422 to the server 430 for processing. The user interface can also enable the user to provide instructions to the server 430 as to what type of media processing is to be performed with respect to the media content. The electronic device 420 can offload media content for processing on the server 430. The server 430 can perform a network based media processing workflow by creating as a pipeline 436 of media processing functions (or tasks) for a received media processing request. For example, a media source, such as the electronic device 420, sends a workflow description to the server 430. The workflow description provides a description of the input. For example, if the input is based on recordings from multiple cameras, the input description can include the number of cameras that recorded the content, the relative position of the cameras with respect to each other, the format the content was captured, and the like. The workflow description can also include a request for the intended media processing, such as VR stitching. Additionally, the workflow description can include a location (such as the media sink 440) the media content is to be moved to after the processing, such as an expected distribution output post processing.

After the server 430 receives the workflow description from the electronic device 420, the server 430 identifies one or more functions, entities, tasks, services, and the like to perform the media processing based on the workflow description and information associated with each of the functions.

In some embodiments, the server 430 can be implemented as shown in FIG. 2. In other embodiments, a portion of the components included in the server 430 can be included in different devices, such as multiple servers 104 or 200, multiple client devices 106-114, multiple electronic devices 300, or a combination of different devices. The server 430 can represent one or more local servers, one or more remote servers, an NBMP framework, or the like. The server 430 can be a web server, a server computer such as a management server, or any other electronic computing system capable of sending and receiving data. The server 430 can include an information repository 432, a workflow manager 434, and a pipeline 436.

The information repository 432 can be the same as or similar to the information repositories 422 and 442. The information repository 432 represents any suitable structure(s) capable of storing and facilitating retrieval of information (such as data, program code, or other suitable information on a temporary or permanent basis). The information repository 432 can include a memory and a persistent storage. The memory can be RAM or any other suitable volatile or non-volatile storage device(s), while the persistent storage can contain one or more components or devices supporting longer-term storage of data, such as a ROM, hard drive, Flash memory, or optical disc.

The information repository 432 can include multiple network based media processing functions, such as the media processing function 470 (the function 470) of FIG. 4C. In some embodiments, network based media processing functions, such as the function 470, are located on a remote server. The function 470 represents a network based media processing function, a network based media processing task, a network based media processing service, a network based media processing entity or the like. The function 470 is a task or node of the pipeline 436a of FIG. 4B.

The function 470 can implement one media processing function or task. When multiple functions are arranged in a workflow pipeline, with each function performing a certain processing task, a pipeline such as the pipeline 436 and the pipeline 436a of FIG. 4B are created. Each of the network based media processing functions when included in a workflow pipeline performs their corresponding tasks in order to complete the requested task from the electronic device 420.

All media processing functions, such as the function 470, are configured individually by the workflow manager 434. In order for the function 470 to perform a task within a workflow, the function 470 receives requirements 472, input media (or metadata or both) 474, and configuration information 476. The function 470 then produces an output 478 based on the received inputs (requirements 472, input data 474, and the configuration information 476).

A media processing function or task (such as the function 470) can receive an input data 474, such as a media data streams, metadata, or both. The function 470 can process the received media data streams and metadata. The function 470 produces the output 478 such as an output media, metadata, or both. The server 430 can use multiple media processing functions of different types to perform the requested processing of the media content. The input and output of the function 470 are described in greater detail below with respect to Table (1). In some embodiments, the network based media processing functions can be created by a third party service provider and included in the directory.

The information repository 432 can also include a directory of functions including network based media processing functions, network based media processing tasks, network based media processing services, and the like, which are available to the workflow manager 434. The directory of functions can also be located remotely from the server 430, such as in a remote database. The directory includes details of each media processing function accessible to the workflow manager 434. The directory can list the details concerning each of the media processing functions, such as (i) task details, (ii) inputs (such as the requirements 472, input data 474, and the configuration information 476 of the function 470 of FIG. 4C), and (iii) outputs (such as the output 478 of the function 470 of FIG. 4C). Table (1) below illustrates an example directory listing multiple functions.

TABLE (1)

| TYPE | NAME | DETAILS | INPUTS | OUTPUTS |
|---|---|---|---|---|
| Function | Function 1 | Function Details | <Input Data> <Configuration data> <Requirement Data> | <Output Data> |
| Function | Function 2 | Function Details | <Input Data> <Configuration data> <Requirement Data> | <Output Data> |
| ... | ... | ... | ... | ... |
| Function n | Function n | Function Details | <Input Data> <Configuration data> <Requirement Data> | <Output Data> |

Table (1) as shown above, illustrates an example structure of the directory and the type of information for each media processing function. For example, Table (1) lists multiple functions each corresponding to a single task, such as function 1, function 2 through function n. Each function includes details that are specific to each function, as well as specific inputs and an output that are specific to each respective function. In some embodiments, Table (1) can also include another column that indicates the API's that are supported by each function. It should be noted that not all the columns are included in each directory. For example, the "type" or "name" column can be omitted. The workflow manager 434 when scanning the directory can read the information associated with the details, inputs, and output.

The "details" describe the task each function performs, and provides any additional information necessary in order to perform the function. For example, the details column can include a (i) description of the function or service, (ii) quality of service (QoS) information, (iii) Notification configuration, (iv) Security configuration, (v) Ingest Information, (vi) Scheduling configuration, (vii) Storage configuration, and (viii) Supported media formats, and the like. The description of the function or service can include information about the underlying function or service. For example, the a description can include the task the function is to perform such as upscaling, encoding, calibration, exposure correction, stitching, to name a few. The QoS information includes type of QoS guarantees available while using the function or service. Also the QoS information can include QoS configuration data that is used for to provide the indicated QoS. The notification configuration can indicate the type of notification available when a media processing function or a media processing workflow is completed. The reporting configuration can include one or more types of reporting information that is available about the usage of corresponding media processing function or service. The security configuration can include information regarding supported authentication mechanisms, access control mechanisms and the like. The security configuration information can indicate the type of information that is required in order to use or access and use the particular function. The ingest information can include methods for data ingestion such as uploading, streaming, and the like. The scheduling configurations include one or more types of scheduling that is supported for using the underlying media processing function or service. The Storage configuration indicates the types of storage options available for persisting input data and output data before or after completion of underlying function or service. The supported media formats indicate the various kinds of supported formats of media such as video, audio, sub-title and the like.

In some embodiments, the details of a single function can be expressed as syntax. For example, if the function performs VR stitching, the Syntax (1) below illustrates an example detail description.

```
Syntax                                                          (1)
    description: [<VR Stitching Service
            description>
    ]
    QoS: [max-input-bitrate=< max-input-bitrate >
            max-input-delay= < max-input-delay >
    ]
    notification-configuration: [
            type="HTTP POST"
            required="url"
    ]
    reporting configuration: [
            type="HTTP POST"
            report-type=<usage>
            required="url"
    ]
    security-configuration: [
            auth=<Supported Auth options>
    ]
    ingest-Information: [
            ingest-mode=<Supported content ingest
                          modes>
    ]
    scheduling-configuration: [
            available=<Supported scheduling
                      options>
    ]
    storage-configuration: [
            storage=<Supported storage options>
    ]
    supported-media-formats: [
            Input=<Supported input formats>
```

Syntax (1) above illustrates the types of information that can be included in the description of a particular function. For example, the function is a VR Stitching Service, the QoS indicates the max input bitrate and the max input delay for the particular function. The notification configuration and the reporting configurations can be performed via HTTP. The workflow manager 434 inspects the details, the input and the output in order to select a particular function based on the system requirements and the instructions included in the workflow description from the electronic device 420.

As illustrated in Table (1) above, each function receives three inputs (such as the requirements 472, input data 474, and the configuration information 476 of the function 470 of FIG. 4C) to create a particular output (such as the output 478 of the function 470 of FIG. 4C).

The "input data" is represented as the input data 474 to the function 470. The input data is the media content, metadata, or a portion of the media content that the particular function is to act on. For example, "input data" can specify a format type of the data, such as a specific format of the data. The type of data can be the actual input data stream or a metadata stream. That is, the input data represents the data that the function uses or manipulates. In some embodiments, the input data can be an input description that provides information describing the type of input for the particular function. For example, the information can include a "MediaInputDescriptor," a "MetadataInputDescriptor," an "OtherInputDescriptor," and the like. The "MediaInputDescriptor," can include details about the type of media input to the particular task or function. The "MetadataInputDescriptor" can include details about the type of metadata input to the particular task or function. The "OtherInputDescriptor," can include details about other types of inputs to the particular task or function.

The "configuration data" is represented as the configuration information 476 of the function 470 of FIG. 4C. The "configuration data" provides configuration information to the function so that the function can initialize its processing parameters with respect to the "input data." For example, the "configuration data" can provide information that is needed for executing the assigned processing for the function. The "configuration data" can include configuration variables, constants, and parameters required by the executable/script assigned to the particular function. The "configuration data" can also include the configuration type of output that the function is to create. The "configuration data" can also include the number of cameras and orientation of each camera when recording the medial. For example, if the recorded media is captured by four cameras, the "configuration data" can include the orientation of each camera such as the location of each camera relative to the other three cameras, the configuration parameters of the cameras, such as the depth of focus, the number of megapixels, lighting conditions, resolution, and the like.

The "requirements" is represented as the requirements 472 of the function 470 of FIG. 4C. The "requirements" provides one or more requirements and pre-condition information to determine where the function should be located and how it is selected by the workflow manager 434. For example, the "requirements" can include QoS information such as delay requirements such as delay requirements, bandwidth requirements, and the like. The "requirements" can also include processing requirements such as compute requirements, storage requirements, infrastructure requirements, and the like that are needed by the particular function in order to perform the required processing. For instance, the processing requirements can indicate particular hardware that the function uses such as a particular processor, such as the number of processors required, by the function the speed of the processors required by the function, the minimum or maximum memory requirements required by the function, the delay or latency for the function to perform its task, and the like.

The outputs column of Table (1) describes the output that the function produces as a result of the processing, based on the input data provided to the function. The output data can be a data stream, metadata, an output configuration, or an output requirement data. In some embodiments, the output data can be an input description that provides information describing the type of output for each function. For example, the information can include a "MediaOutputDescriptor," a "MetadataOutputDescriptor," an "OtherOutputDescriptor," and the like. The "MediaOutputDescriptor," can include details about the type of media output from the particular task or function. The "MetadataOutputDescriptor," can include details about the type of metadata output from the particular task or function. The "OtherOutputDescriptor" can include details about the type of metadata output from the particular task or function.

In some embodiments, an end user can look up or search the functions included in the directory to identify particular network based media processing functions available by the operator. The end user can then pick and choose one or more functions and build a pipeline and offer the pipeline as a workflow. In some embodiments, the workflow manager 434 can receive a request for processing and select the particular functions necessary to perform the processing on behalf of the electronic device 420.

The workflow manager 434 can receive the workflow description from the electronic device 420. The workflow manager 434 can search through all of the available functions and services within the directory (such as the directory within the information repository 432 and described above with respect to Table (1)). Based on the information of each function that is included in the directory, the workflow manager 434 inspects requirements of the functions and elects one or more network based media processing functions to build the pipeline 436. An example workflow pipeline 436a is illustrated below in FIG. 4B. The workflow manager 434 selects and maps each of the media processing functions to create a pipeline the pipeline 436.

For example, once the network operator or third party service provider defines the multiple functions that are represented in the directory, the server 430 can receive a request for media processing. The workflow manager 434 can receive a media processing request from the electronic device 420. The request for media processing can include a particular input of media data, a requested media output of the processing as well as certain processing requirements such as delays and the like. In some embodiments, the electronic device 420 represents multiple electronic devices, each of which can sent media processing requests to the server 430.

When a request for media processing is received from the electronic device 420, the workflow manager 434 scans the directory that includes all of the available services and functions. In response to receiving the request, the workflow manager 434 inspects the specified requirements for each function, service, task, and the like that are included in the directory. For example, based on the request and functions within the directory, the workflow manager 434 reviews each functions details, inputs, output (see inputs of Table (1) above) when selecting each function.

The workflow manager 434 selects certain functions from the directory which are able to perform the processing. The workflow manager 434 uses selected functions to build the media processing pipeline, such as the pipeline 436. For example, the workflow manager 434 can select each subsequent function of the pipeline 436 based on the output of the previous function, until the requested end result is able to be accomplished. Such that the output of a first function is the input of a second function, the output of the second function is the input of a third function, and so-on until the requested processing is complete. In some embodiments, the pipeline 436 is not linear such as the pipeline 436a as illustrated in FIG. 4B. In some embodiments, the workflow manager 434 can instruct certain functions to produce multiple outputs such that the output is sent to a corresponding number of subsequent functions. The workflow manager 434 also selects particular functions based on the processing requirement included in the request. Thereafter, the workflow manager 434 organizes each selected function in a pipeline, such as the pipeline 436 to perform the media processing.

The workflow manager 434 can also selects certain functions based on the overall latency of each individual function. For example, if the workflow is to be complete within a certain time duration (as indicated in the received workflow description), the workflow manager 434 selects certain functions that can perform the entire workflow within the allotted end-to-end latency as indicated in the received workflow description. The workflow manager 434 can also select certain functions based on a maximum or minim allowed frame rate, process speed, and the like.

As detailed above each function includes certain requirements in order to execute appropriately. The requirements can include a number of CPUs, a number of GPUs, a memory requirement, a bandwidth requirement and the like. When the workflow manager 434 selects certain functions, the work flow manager 434 inspects the requirements of each function and selects functions based on the system parameters to ensure that each function has the necessary requirements to perform its respective processing task.

The workflow manager 434 maps the source request to appropriate media processing functions in the pipeline 436 based on each functions pre-defined requirements. The workflow manager 434 then maps the source request to each function in the pipeline 436 based on the functions services defined the in the requirements of each function (as shown in Table (1) above).

The workflow manager 434 can monitor each individual function as each function performs its processing of the media. Monitoring each function can include identifying if a function fails while performing its task. Monitoring each function can also include identifying if the function can requires a different input format than indicated in the directory or produce a different output than indicated in the directory. If the workflow manager 434 identifies that a function fails, the workflow manager 434 can select one or more new functions to replace the failed function in the pipeline 436. Similarly, if the workflow manager 434 identifies that the input or output of a function is incorrect to perform the intended workflow, then the workflow manager 434 can remove the incorrect function, and replace it with one or more new functions. Alternatively, the workflow manager 434 can select one or more additional functions from the directory that changes the format of the input or output of a function in order that the workflow of the pipeline 436 processes the media content.

The pipeline 436 represents a workflow pipeline with any number of selected functions that are mapped in a certain order to perform the processing request. In some embodiments, the pipeline 436 can be linear workflow such that the output of each function is the input to the next subsequent function, until the processing is complete. In some embodiments, the pipeline 436 represents a workflow that is not linear as shown in in the pipeline 436a of FIG. 4B. In some embodiments, the functions in a workflow pipeline can occur in series, while other functions occur in parallel (at the same or similar time).

For example, the electronic device 420 can send a request to the server 430 for VR stitching. VR stitching can occur when VR content (360 degree video content) is captured by multiple cameras, and stitched together to form a final VR video that can be rendered on a head mounted display, or the like. The process of stitching multiple videos into a single video can be computationally draining, such as when the videos include a large number of frames per second or include high resolution, such as 4K or 8K. The multiple media streams from different cameras can be sent to the operator or third party cloud, such as the server 430 which uses network based media processing functions to stitch the multiple videos together. The VR stitching process can include a (i) calibrating the source input video streams, (ii) exposure correction, (iii) control point identification, and (iv) the stitching processes. The workflow manager 434 scans the directory and selects four functions to perform the workflow. The first function of calibrating the source input stream involves calibration of the initial videos so the videos are synchronized. The requirements 472 are the required processing and memory components the function requires. The input data 474 can he the multiple video feeds and the rig setup. The configuration information 476 can include the QoS information, notifications, storage configurations, and the like needed by the function to perform the task of calibration. The output 478 is the calibrated video sequence.

The second function, involves exposure compensation as the source cameras that recorded the video could have been included different exposure settings. The function can compensate for the exposure differences between the different cameras and generate multiple exposure compensated video sequences. The exposure correction function receives the calibrated and synchronized input data (such as the input data 474) and generates exposure compensated video sequence (output 478).

The third function identifies control points, such as common features, in all of the video images, from the different cameras. The identified control points become the basis for the stitching process (of the fourth function). This function receives as the input data 474 the exposure compensated video, and generates as its output 478 control point metadata.

The fourth function, involves stitching the different input video feeds together to create the final VR stitched video. The input data 474 of the stitching function can include (i) the set of exposure compensated input video sequences from all he cameras in the rig (as created in the second function), (ii) the control point metadata (as created in the third function), (iii) the camera rig information, such as the type of input cameras (including lens type such as fish-eye, macro, and the like), (iv) the field of view of each camera, (v) the cameras location and orientation, (vi) resolution of each camera, and the like. Using all this information, the fourth function generates the final stitched VR video.

In some embodiments, an end user can select and organize the individual functions into a workflow pipeline and allow customers the customers of the end user to use the created function. In some embodiments, a user can access the workflow manager 434 and request the workflow manager 434 to create a workflow pipeline based on the requested processing task and input data.

In another example, the electronic device 420 can send a request to the server 430 for transcoding and distribution of VR stitching content in a workflow pipeline with parallel media processing functions. VR transcoding pipeline can include a VR stitching task, and multiple transcoding tasks, each of the multiple transcoding tasks can include a different set of options. When the end user requires distribution of different types of transcoded content for a stitched video, the workflow manager 434 can build a media processing pipeline, of the different functions. For example, the input would be the media content form a camera, and the camera rig information, such as the orientation of the camera, and the number of cameras. The pipeline would include a VR stitching function that outputs data to multiple transcoding function that run in parallel. For example, when the VR stitching function is complete, the workflow pipeline can enable multiple transcoding functions to process the data each function with a different set of transcoding functions. When the multiple transcoding function complete their task, the pipeline outputs a video with multiple transcoding options. The output can be distributed as indicated in the request. For example, the output can be returned to the electronic device 420, delivered to the media sink 440 of FIG. 4A, or any other intended task.

FIG. 4B illustrates a workflow pipeline with multiple tasks, tasks 451-459. Each task represents a function, similar to the function 470, of FIG. 4C. The workflow manager 434 selects each of the tasks 451-459 in order to generate the output 460 based on a received workflow description from the electronic device 420. Task 451, 453, and 455 can receive the input data, or a portion of the input data. In some embodiments, a function can receive multiple inputs such as the tasks 454 and 457. In some embodiments, a function can generate multiple outputs, such as the task 451 and 454. In some embodiments, functions can process data in parallel such as the tasks 454, 457, 459, 456, and 458.

Although FIG. 4A illustrate the environment-architecture, FIG. 4B illustrates an example pipeline, and FIG. 4C illustrates an example function various changes can be made to FIGS. 4A, 4B, and 4C. For example, any number of functions can be included in the pipeline 436a.

Figure 5:
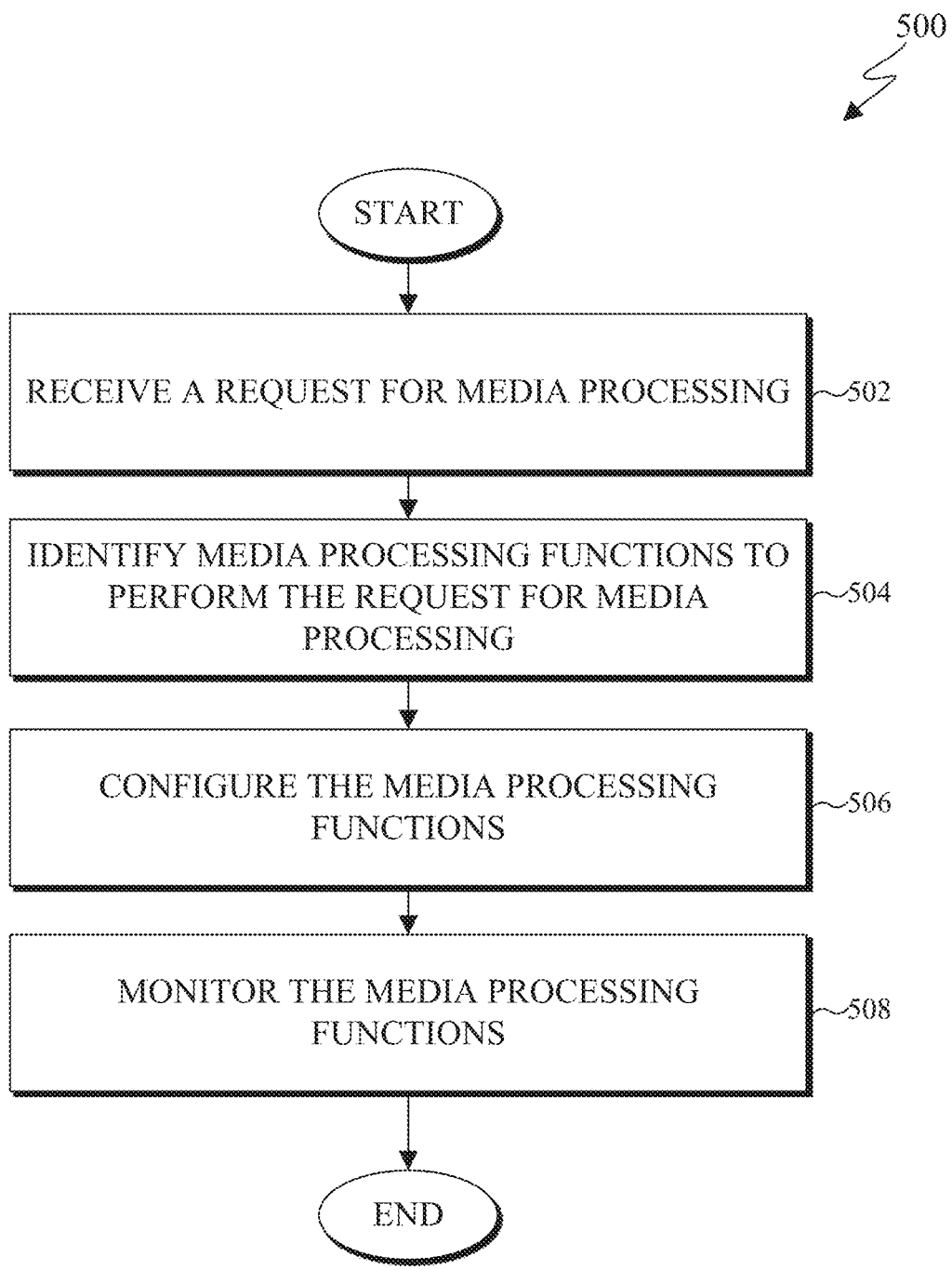
FIG. 5 illustrates an example method for processing media processing in the network in accordance with an embodiment of this disclosure.

FIG. 5 illustrates an example method for processing media processing in the network in accordance with an embodiment of this disclosure. For example, the process depicted in FIG. 5 is described as implemented by the server 200 of FIG. 2, the electronic device 300 of FIG. 3, the electronic device 420 and the server 430 of FIG. 4A.

The process begins with the server 430 receiving a request for media processing (step 502). The request can include a workflow description. The workflow description can indicate the intended media processing, such as a requested media output. The workflow description can include information associated with the media data such as the number of cameras, the camera orientation, settings of the content captured by the cameras such as the frames per second, resolution, focal depth, and the like. The workflow description include a location (such as the media sink 440) the media content is to be located after the processing.

The workflow manager 434 can identify functions to perform the media processing (step 504). The workflow manager 434 can search through a directory of multiple functions (such as a directory including multiple media processing functions), and select the one or more functions from the directory based on information that is associated with each of the multiple functions. The information associated with the functions can include input information describing an input type a function is able to process. The information can also include output information describing a result the function generates. Additionally, the information and also include requirement information indicating one or more types of information the function uses in order to process a received input. Each of the functions upon receiving configuration data, input media data, and requirements, and generate an output media.

After selecting one or more functions from the directory, the workflow manager 434 organizes each of the one or more functions into a pipeline. In some embodiments, a function generates a single output that is used as the input to the next subsequent function. In other embodiments, a function can generate multiple outputs which can be used as inputs to a corresponding number of functions.

The workflow manager 434 can configure each of the functions (step 506). To configure the functions the workflow manager 434 can map the request for media processing to certain functions based on the information associated with each function. Mapping the media processing to the respective function enables each function to receive the necessary information and requirement processing capabilities for processing the media data to generate the requested media output. For example, the workflow manager 434 ensures that each function receives data in a format and in a particular order to perform the media processing.

The workflow manager 434 can monitor the functions while the functions perform tasks to generate the requested media output (step 508). The workflow manager 434 can identify whether a function fails to process an input as indicated by the information within the directory. For example, the function may need a different type of input data, generate a different type of output data, be corrupted and unable to perform the intended media processing task, and the like. In response to identifying the first function fails to process the media data, the workflow manager 434 identifies one or more new functions to perform the media processing which that first function was intended to perform. For example, the workflow manager 434 can select two functions that perform that in combination generate the result of the single function that fails. For instance, the first function generates the result, and the second function changes the format of the result to be usable by a subsequent function. Thereafter, the workflow manager 434 maps the new functions in place of the function that failed. If no function fails, the workflow manager 434 waits until another request to process data is received such as in step 502.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a communication interface configured to receive, from a media source, a request for media processing, the request including a requested media output;
   a processor configured to:
   in response to receiving the request, select multiple media processing functions from a plurality of media processing functions to perform various portions of the request for media processing, wherein the selected media processing functions are identified based on information that describes and is associated with each of the plurality of media processing functions, the information comprises:
      input information describing an input type that a function is able to process,
      output information describing an output that the function generates, and
      requirement information that the function uses in order to process a received input;
   configure each of the multiple media processing functions into a pipeline by mapping the request for media processing to the multiple media processing functions to generate the requested media output based on the information associated with each of the multiple media processing functions, wherein an output of one of the multiple media processing functions is mapped to an input of another one of the multiple media processing functions;
   monitor the multiple media processing functions while the multiple media processing functions perform tasks to generate the requested media output; and
   based on the monitoring, modify the pipeline of the multiple media processing functions to generate the requested media output.

2. The electronic device of claim 1, wherein:
   the processor is further configured to analyze the request for media processing to identify media data, and
   to select the multiple media processing functions the processor is configured to:
      search a directory listing the plurality of media processing functions for the multiple media processing functions that when organized into the pipeline, modify the media data based on the requested media output, and
      select the multiple media processing functions from the directory based on the information associated with each of the multiple media processing functions.

3. The electronic device of claim 2, wherein the processor is further configured to transmit, to a destination indicated in the request, a generated output from the multiple media processing functions, the generated output corresponding to the requested media output.

4. The electronic device of claim 1 wherein to configure each of the multiple media processing functions, the processor is configured to:
   organize each of the multiple media processing functions into the pipeline,
   wherein, the multiple media processing functions, when organized, are mapped to one another, and perform respective portions of the media processing until the requested media output is generated.

5. The electronic device of claim 4 wherein the processor is further configured to:
   connect the multiple media processing functions,
   wherein one function of the multiple media processing functions receives one input from another of the multiple media processing functions or receives two or more inputs from different media processing functions of the multiple media processing functions, and
   wherein the one function generates multiple outputs that are received by subsequent media processing functions of the multiple media processing functions.

6. The electronic device of claim 1 wherein
   each of the multiple media processing functions receives configuration data, input media data corresponding to the input information, and requirements corresponding to the requirement information, and generates an output corresponding to the output information.

7. The electronic device of claim 1, wherein to monitor the multiple media processing functions, the processor is configured to:
   identify whether a first function of the multiple media processing functions fails to process an input as indicated by the information associated with each of the multiple media processing functions;
   in response to identifying that the first function fails to process the input, identify multiple new media processing functions to perform the media processing which that first function was intended to perform; and
   map the multiple new media processing functions in place of the first function.

8. A method comprising:
   receiving, from a media source, a request for media processing, the request including a requested media output;

in response to receiving the request, select multiple media processing functions from a plurality of media processing functions to perform various portions of the request for media processing, wherein the selected media processing functions are identified based on information that describes and is associated with each of the plurality of media processing functions, the information comprises:
  input information describing an input type that a function is able to process,
  output information describing an output that the function generates, and
  requirement information that the function uses in order to process a received input;
configuring each of the multiple media processing functions into a pipeline by mapping the request for media processing to the multiple media processing functions to generate the requested media output based on the information associated with each of the multiple media processing functions, wherein an output of one of the multiple media processing functions is mapped to an input of another one of the multiple media processing functions;
monitoring the multiple media processing functions while the multiple media processing functions perform tasks to generate the requested media output; and
based on the monitoring, modifying the pipeline of the multiple media processing functions to generate the requested media output.

9. The method of claim 8, further comprising:
analyzing the request for media processing to identify media data,
wherein selecting the multiple media processing functions comprises:
  searching a directory listing the plurality of media processing functions for the multiple media processing functions that when organized into the pipeline, modify the media data based on the requested media output, and
  selecting the multiple media processing functions from the directory based on the information associated with each of the multiple media processing functions.

10. The method of claim 9, further comprising transmitting, to a destination indicated in the request, a generated output from the multiple media processing functions, the generated output corresponding to the requested media output.

11. The method of claim 8, further comprising:
organizing each of the multiple media processing functions into the pipeline,
wherein, the multiple media processing functions, when organized, are mapped to one another, and perform respective portions of the media processing until the requested media output is generated.

12. The method of claim 11, further comprising:
connecting the multiple media processing functions,
wherein one function of the multiple media processing functions receives one input from another of the multiple media processing functions or receives two or more inputs from different media processing functions of the multiple media processing functions, and
wherein the one function generates multiple outputs that are received by subsequent media processing functions of the multiple media processing functions.

13. The method of claim 8, wherein
each of the multiple media processing functions receives configuration data, input media data corresponding to the input information, and requirements corresponding to the requirement information, and generates an output corresponding to the output information.

14. The method of claim 8, wherein monitoring the multiple media processing functions, comprises:
identifying whether a first function of the multiple media processing functions fails to process an input as indicated by the information associated with each of the multiple media processing functions;
in response to identifying that the first function fails to process the input, identifying multiple new media processing functions to perform the media processing which that first function was intended to perform; and
mapping the multiple new media processing functions in place of the first function.

15. A non-transitory computer readable medium embodying a computer program, the computer program comprising computer readable program code that, when executed by a processor of an electronic device, causes the processor to:
receive, from a media source, a request for media processing, the request including a requested media output;
in response to receiving the request, select multiple media processing functions from a plurality of media processing functions to perform various portions of the request for media processing, wherein the selected media processing functions are identified based on information that describes and is associated with each of the plurality of media processing functions, the information comprises:
  input information describing an input type that a function is able to process,
  output information describing an output that the function generates, and
  requirement information that the function uses in order to process a received input;
configure each of the multiple media processing functions into a pipeline by mapping the request for media processing mapping the request for media processing to the multiple media processing functions to generate the requested media output based on the information that describes and is associated with each of the multiple media processing functions, wherein an output of one of the multiple media processing functions is mapped to an input of another one of the multiple media processing functions;
monitor the multiple media processing functions while the multiple media processing functions perform tasks to generate the requested media output; and
based on the monitoring, modify the pipeline of the multiple media processing functions to generate the requested media output.

16. The non-transitory computer readable medium of claim 15, wherein:
the program code, when executed by the processor, further causes the processor to analyze the request for media processing to identify media data, and
to select the multiple media processing functions, the program code, when executed by the processor, further causes the processor to:

search a directory listing the plurality of media processing functions for the multiple media processing functions that when organized into the pipeline, modify the media data based on the requested media output, and select the multiple media processing functions from the directory based on the information associated with each of the multiple media processing functions.

17. The non-transitory computer readable medium of claim 16, wherein the program code, when executed by the processor, further causes the processor to transmit, to a destination indicated in the request, a generated output from the multiple media processing functions, the generated output corresponding to the requested media output.

18. The non-transitory computer readable medium of claim 15 wherein the program code, when executed by the processor, further causes the processor to organize each of the multiple media processing functions into the pipeline, wherein, the multiple media processing functions, when organized, are mapped to one another, and perform respective portions of the media processing until the requested media output is generated.

19. The non-transitory computer readable medium of claim 15, wherein each of the multiple media processing functions receives configuration data, input media data corresponding to the input information, and requirements corresponding to the requirement information, and generates an output corresponding to the output information.

20. The non-transitory computer readable medium of claim 15, wherein to monitor the multiple media processing functions, the program code, when executed by the processor, further causes the processor to:

identify whether a first function of the multiple media processing functions fails to process an input as indicated by the information associated with each of the multiple media processing functions;

in response to identifying that the first function fails to process the input, identify multiple new media processing functions to perform the media processing which that first function was intended to perform; and map the multiple new media processing functions in place of the first function.

* * * * *